(12) United States Patent
Aiba et al.

(10) Patent No.: US 9,188,213 B2
(45) Date of Patent: Nov. 17, 2015

(54) DIFFERENTIAL APPARATUS

(75) Inventors: Satoshi Aiba, Tochigi (JP); Akihisa Shimada, Tochigi (JP)

(73) Assignee: GKN Driveline Japan LTD., Tochigi (JP)

( * ) Notice: Subject to any disclaimer, the term of this patent is extended or adjusted under 35 U.S.C. 154(b) by 408 days.

(21) Appl. No.: 13/291,502

(22) Filed: Nov. 8, 2011

(65) Prior Publication Data

US 2012/0115669 A1    May 10, 2012

(30) Foreign Application Priority Data

Nov. 8, 2010   (JP) .................................. 2010-250171

(51) Int. Cl.
*F16H 48/08*    (2006.01)

(52) U.S. Cl.
CPC .......... *F16H 48/08* (2013.01); *F16H 2048/087* (2013.01)

(58) Field of Classification Search
CPC ......... F16H 48/06; F16H 48/08; F16H 48/10; F16H 48/11; F16H 48/40; F16H 2048/085; F16H 2048/087; B60B 35/16
USPC ............................................. 475/230; 74/607
See application file for complete search history.

(56) References Cited

U.S. PATENT DOCUMENTS

| | | | | |
|---|---|---|---|---|
| 1,641,190 A * | 9/1927 | Morgan | ......................... | 475/229 |
| 2,924,125 A * | 2/1960 | Brandon | ............................ | 475/9 |
| 2,971,404 A * | 2/1961 | Thornton | ...................... | 475/235 |
| 3,049,943 A * | 8/1962 | Frentzel | ......................... | 475/90 |
| 3,057,226 A * | 10/1962 | Blomberg | ...................... | 475/230 |
| 3,145,583 A * | 8/1964 | Frentzel | ......................... | 475/90 |
| 3,930,424 A | 1/1976 | Myers, Sr. | | |
| 4,037,492 A * | 7/1977 | Ashauer et al. | ............... | 475/160 |
| 4,541,306 A * | 9/1985 | Hokusho et al. | .............. | 475/230 |
| 4,733,578 A * | 3/1988 | Glaze et al. | ................... | 475/246 |
| 5,233,757 A * | 8/1993 | Maguire | ...................... | 29/893.1 |
| 5,584,777 A * | 12/1996 | Sander et al. | ................. | 475/230 |
| 5,857,936 A * | 1/1999 | Ishikawa | ....................... | 475/231 |
| 6,066,063 A * | 5/2000 | Ishikawa | ....................... | 475/234 |

(Continued)

FOREIGN PATENT DOCUMENTS

| | | |
|---|---|---|
| CN | 101688595 A | 3/2010 |
| CN | 201615201 U | 10/2010 |

(Continued)

OTHER PUBLICATIONS

English Patent Abstract of JP 2009250320, Publication Date: Oct. 29, 2009 (1 Page).

(Continued)

*Primary Examiner* — Edwin A Young
*Assistant Examiner* — Colby M Hansen
(74) *Attorney, Agent, or Firm* — Osha Liang LLP

(57) ABSTRACT

A differential apparatus is provided with a case; a pinion gear; a pair of side gears meshing with the pinion gear; a spherically depressed pinion gear supporting surface portion formed on an inner surface of the case to support a spherically projecting back side portion of the pinion gear; and spherically depressed side gear supporting surface portions formed on the inner surface of the case to respectively support spherically projecting back side portions of the side gears. The projecting back side portions of the side gears which are slidable on the depressed side gear supporting surface portions are formed on tooth portions of the side gears.

9 Claims, 8 Drawing Sheets

(56) References Cited

U.S. PATENT DOCUMENTS

| | | | |
|---|---|---|---|
| 6,176,152 B1 * | 1/2001 | Victoria et al. | 74/607 |
| 6,413,183 B1 * | 7/2002 | Ishikawa et al. | 475/160 |
| 6,840,883 B2 * | 1/2005 | Orr et al. | 475/230 |
| 7,306,537 B2 * | 12/2007 | Nakajima | 475/230 |
| 2005/0020397 A1 | 1/2005 | Santelli | |
| 2005/0037888 A1 | 2/2005 | Bostbarge | |
| 2007/0191171 A1 * | 8/2007 | Pascoe et al. | 475/230 |
| 2009/0088287 A1 | 4/2009 | Chludek et al. | |
| 2009/0137357 A1 * | 5/2009 | Meier et al. | 475/230 |
| 2010/0130325 A1 | 5/2010 | Gutmann | |

FOREIGN PATENT DOCUMENTS

| | | | |
|---|---|---|---|
| EP | 1927498 A1 | 6/2008 | |
| JP | S57196844 U | 12/1982 | |
| JP | 2003294109 A | 10/2003 | |
| JP | 2005504249 A | 2/2005 | |
| JP | 2009250320 A | 10/2009 | |
| WO | 03031843 A1 | 4/2003 | |

OTHER PUBLICATIONS

English Patent Abstract of JP 2003294109, Publication Date: Oct. 15, 2003 (1 Page).

Japanese Office Action for Application No. 2010-250171, mailed on Mar. 4, 2014 (4 pages).

* cited by examiner

DIFFERENTIAL APPARATUS

BACKGROUND OF THE INVENTION

1. Field of the Invention

The present invention relates to a differential apparatus which is provided on a motor vehicle.

2. Related Art

Patent Document 1 discloses a differential apparatus in which a case is formed of a one-piece member. In the differential apparatus of Patent Document 1, a working tool is inserted into the case from an opening therein so as to machine an interior of the case to produce a spherical inner space defined by a spherical inner surface. A pinion gear and a pair of side gears are inserted into the spherical inner space, and back sides of these gears are supported on the spherical inner surface. Spherical washers are interposed between the back sides of the gears and the spherical inner surface.

In this differential apparatus, external and internal shapes of the case can be simplified, and the machining is facilitated. In addition, the pinion gear and the pair of side gears are assembled together in a compact fashion for disposition in the interior of the case.

In addition, meshing reaction forces of the pinion gear and the pair of side gears are slidingly supported on the spherical back sides of the gears. Therefore, the sliding frictional properties of the gears are stable, and the durability of the gears is high.

However, when this differential apparatus is mounted on a vehicle, in the event that frictional resistances of a left wheel and a right wheel with a road surface come to differ, due to the characteristics of this differential apparatus, it becomes difficult to transmit a driving force which is equal to or greater than the driving force of the wheel with a lower frictional resistance.

This problem has conventionally been understood as a technical problem which is inherent in a differential apparatus having no differential action limiting function (referred to as a so-called "conventional-differential") due to the configuration and function thereof.

In contrast with this conventional-differential, various types of differential apparatuses with a differential action limiting function (referred to as a so-called limited slip differential (LSD)) are used on sport-type and 4WD vehicles.

Even in a general vehicle with a conventional-differential, such a differential action limiting function would be effective when attempting to increase the starting and hill-climbing properties thereof.

Patent Document 2 discloses a differential apparatus in which a case is formed of a one-piece member, and a pinion gear and a pair of side gears are inserted from an opening in the case. In the differential apparatus of Patent Document 2, a differential action limiting function is provided by tapered surfaces formed on the pair of side gears and the case.

However, according to the differential apparatus of Patent Document 2, in order to provide the differential action limiting function, it is required to form the tapered surfaces on the case and the pair of side gears, which causes the following problems.

First, a severe machining accuracy relating to a tapering angle is required to the tapered surfaces, which increases mashing manhours.

Second, the tapered surface is provided on an external side of the side gear, and therefore, the differential apparatus is enlarged in both radial and axial directions.

Third, although Patent Document 2 also discloses a differential mechanism as another embodiment which uses a multi-plate clutch as a differential action limiting function device, it is obvious that the number of parts involved is increased, and the differential apparatus is enlarged.

[Patent Document 1] JP-A-2009-250320
[Patent Document 2] JP-A-2003-294109

SUMMARY OF THE INVENTION

One or more embodiments of the present invention relates to a differential apparatus including a differential action limiting function which is simple in construction and low in cost.

In accordance with the one or more embodiments, a differential apparatus 1 may include: a case 3; a pinion gear 17 supported in the case 3 so as to rotate about its own axis; a pair of side gears 23, 25 which are supported in the case 3 and mesh with the pinion gear 17, wherein the side gears 23, 25 are rotatable relatively to each other; a spherically depressed pinion gear supporting surface portion 9, 11 which is formed on an inner surface of the case 3 and adapted to support a spherically projecting back side portion 17a of the pinion gear 17 so that the pinion gear 17 is slidingly rotatable about its own axis; and spherically depressed side gear supporting surface portions 13, 15 which are formed on the inner surface of the case 3 and adapted to respectively support spherically projecting back side portions 23a, 25a of the side gears 23a, 25a so that the side gears 23a, 25a are slidingly rotatable about their own axes. In the differential apparatus, the projecting back side portions 23a, 25a of the side gears 23, 25 which are slidable on sides of the depressed side gear supporting surface portions 13, 15 may be formed on tooth portions 53 of the side gears 23, 25.

According to the structure of the differential apparatus 1 of the one or more embodiments, an effective friction radius between the depressed side gear supporting surface portions on the case and the projecting back side portions of the side gears can be made large. Thus, an LSD which is linked with a drive system and having a good response can be obtained with a simple construction, and a differential apparatus which is simple in construction and low in cost can be obtained.

DETAILED DESCRIPTION OF THE EMBODIMENTS

The description of the invention will be given hereinbelow on the basis of an embodiment and modifications with reference to the drawings. Further, the embodiment and the modification are not intended to limit the invention but to serve as examples thereof, and all features or combinations described in the embodiment and the modifications are not always essential to the invention.

Embodiment 1

Overall Configuration of Differential Apparatus

Figure 1:
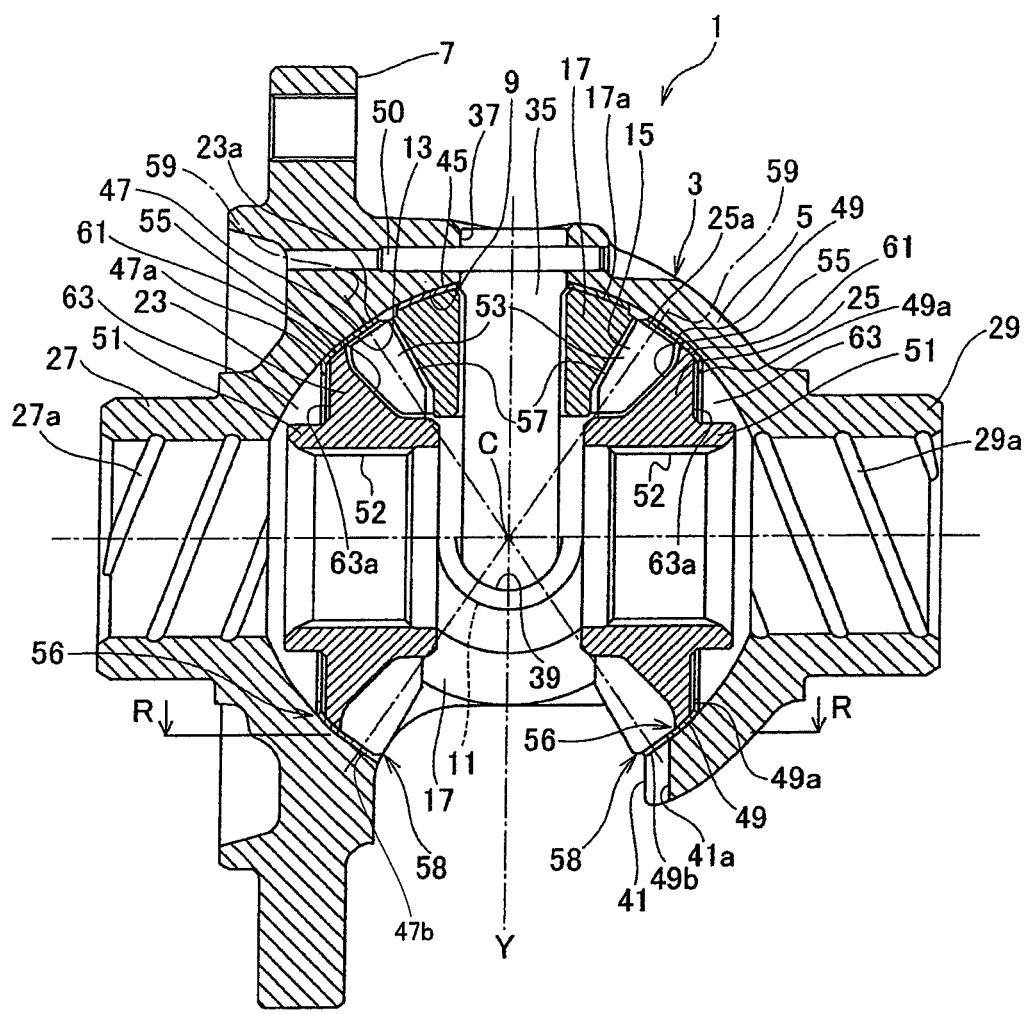
FIG. 1 is a sectional view of a differential apparatus with upper and lower sections located in positions which differ through 90 degrees.

FIG. 1 is a sectional view of a differential apparatus according to an Embodiment 1 and of which upper and lower half sections are located in positions which deviate through 90 degrees.

A case 3 of a differential apparatus 1 has a ring gear mounting flange portion 7 which is provided integrally on an outer surface of a case wall portion 5 so as to extend therearound in a circumferential direction. Depressed pinion gear supporting surface portions 9, 11 (however, the depressed pinion gear supporting surface portion 11 is positioned on a back side of a pinion gear 17 which is positioned at a lower portion in FIG. 1, and hence, a leader line therefor is indicated by a dotted line) and depressed side gear supporting surface portions 13, 15 are formed on an inner surface of the case 3. The depressed pinion gear supporting surface portions 9, 11 and the depressed side gear supporting surface portions 13, 15 each constitute parts of concentric spherical surfaces which have a common center of curvature C thereof at an intersection point where rotational axes of the pinion gears 17 and the side gears 23, 25 in the case 3 intersect each other.

The fact that the depressed pinion gear supporting surface portions 9, 11 and the depressed side gear supporting surface portions 13, 15 each "constitute part of a concentric spherical surface" means that the depressed pinion gear supporting surface portions 9, 11 and the depressed side gear supporting surface portions 13, 15 only have to be spherically machined to attain necessary surface areas, and therefore other inner wall surface portions than those depressed supporting surface portions are cast to have a slightly larger diameter than those of the depressed supporting surface portions so as to function as machining relieves.

However, the differential apparatus 1 of Embodiment 1 differs from the differential apparatus disclosed in Patent Document 2 in that special frictional surfaces made of tapered surfaces are not provided on back sides of the pair of side gears 23, 25 and in that special frictional surfaces made of tapered surfaces are not combined with the inner wall surface of the case 3. In the differential apparatus 1 of Embodiment 1, the interior of the case 3 is only machined into the spherical surface which can slidably support the pinion gears 17 and the side gears 23, 25. Thus, the technical configuration and meaning thereof of the Embodiment 1 totally differ from the technical configuration and meaning thereof disclosed in Patent Document 2.

In addition, the pinion gears 17 shown in FIG. 1 are of a two-pinion type in which one of the pinion gears 17 is shown in section, while the other pinion gear 17 is shown externally as being viewed in an axial direction. As is disclosed in FIG. 6, which will be described later, the differential apparatus 1 includes a pair of pinion gears 17 which are disposed so as to face each other.

The pinion gears 17, 17 and the side gears 23, 25 are gear sets of bevel gears and are supported, respectively, by the spherically depressed pinion gear supporting surface portions 9, 11 and the spherically depressed side gear supporting surface portions 13, 15 which are formed on the inner surface of the case 3.

Boss portions 27, 29 are formed on both sides of the case wall portion 5 in the direction of a rotational axis of the case 3 in positions lying at external sides of the depressed side gear supporting surface portions 13, 15, respectively. The case 3 can be supported rotatably on a differential carrier, which is a stationary member not shown, via corresponding bearings at the boss portions 27, 29. Spiral grooves 27a, 29a are formed on inner circumferences of the boss portions 27, 29, respectively, so as to extend in an opposite direction for introduction of lubricating oil which is sealed in an interior of the differential carrier.

Supporting holes 37, 39 of a pinion shaft 35 is formed coaxially through centers of the pair of depressed pinion gear supporting surface portions 9, 11 which face each other on an inner surface of the case wall portion 5.

A pair of windows 41 (however, only one of them is shown in the lower half section of FIG. 1) are formed in the case wall portion 5 so as to lie adjacent to the flange portion 7.

The pair of windows 41 are formed so as to face each other in the direction of a turning radius so that a balance in weight is kept. The windows 41 enable the insertion of a cutting tool from either of them and also enable the case 3 to turn around the cutting tool about a machining rotational axis C-Y which passes through the center of curvature C. A cutaway depressed portion 41a having a shape which correspond to one tooth (or two or more teeth as required) is formed in the window 41 so as to facilitate the incorporation of the pinion gear 17 into the interior of the case 3.

The case 3 is held by a chuck jig of a lathe and is then turned about the machining rotational axis C-Y to cut the inner surface of the case 3 so as to form the depressed pinion gear supporting surface portions 9, 11 and the depressed side gear supporting surface portions 13, 15 on the inner surface.

The pinion gear 17 is supported at a spherically projecting back side portion 17a thereof on the spherically depressed pinion gear supporting surface portion 9 which is concentric with the spherically projecting back side portion 17a so as to slidably rotate on the spherically depressed pinion gear supporting surface portion 9 via a spherical pinion washer 45.

The pinion gears 17 are supported rotatably on the pinion shaft 35. The pinion shaft 35 is fittingly supported in the supporting holes 37, 39 and is prevented from being dislodged and rotating by a spring pin 50.

The side gears 23, 25 mesh with the pinion gears 17 and are supported at spherically projecting back side portions 23a, 25a thereof on the spherically depressed side gear supporting surface portions 13, 15 which are concentric with the corresponding spherically projecting back side portions 23a, 25a so as to slidably rotate on the spherically depressed side gear supporting surface portions 13, 15 via spherical side washers 45, 49, respectively.

[Projecting Back Side Portion and Side Washer]

Figure 2:
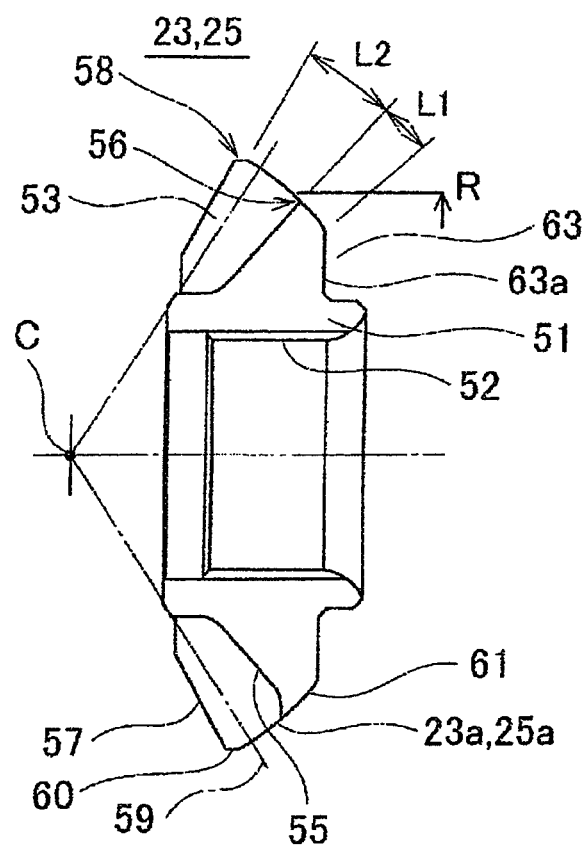
FIG. 2 is a sectional view of a side gear.
Figure 3:
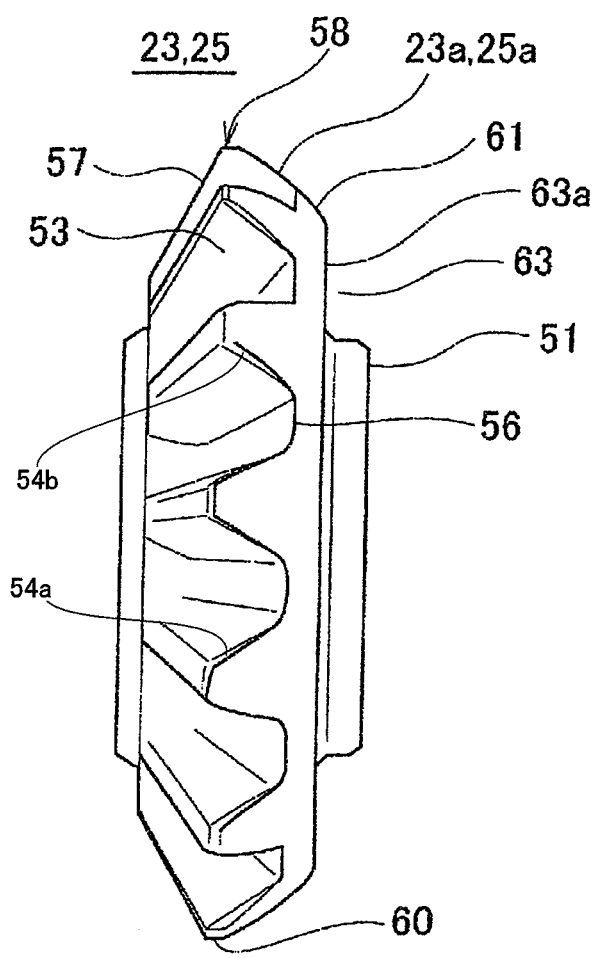
FIG. 3 is a side view of the side gear.
Figure 4:
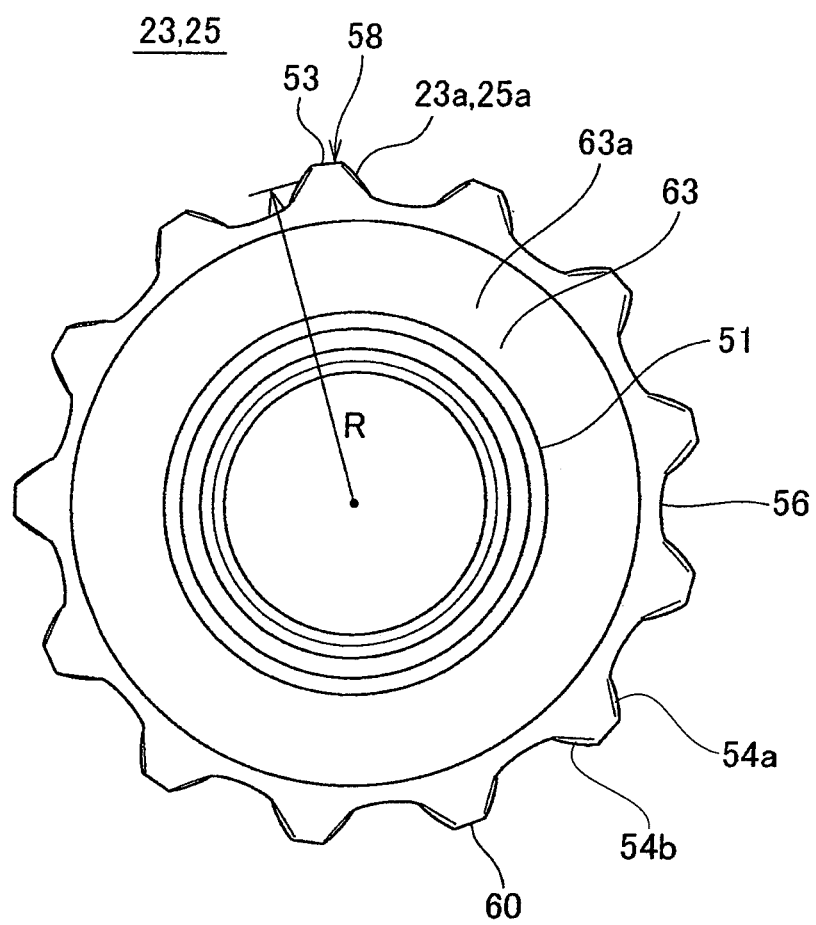
FIG. 4 is a back view of the side gear.
Figure 5:
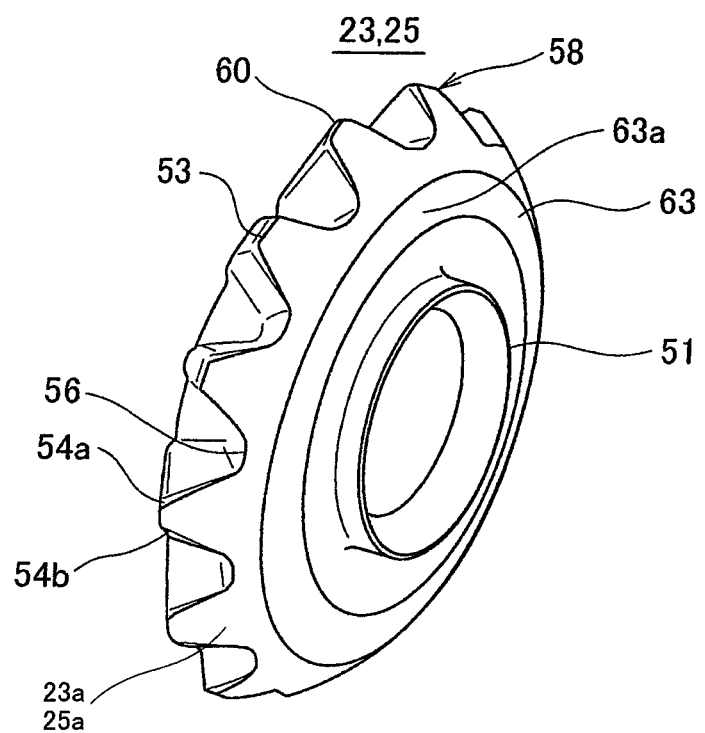
FIG. 5 is a back side perspective view of the side gear.

FIG. 2 is a sectional view of the side gear, FIG. 3 is a side view of the side gear, FIG. 4 is a back view of the side gear, and FIG. 5 is a back side perspective view of the side gear.

As FIGS. 1 to 5 show, the side gears 23, 25 are bevel gears having the same shape, and a tooth portion 53 is formed on an outer circumferential side of a boss portion 51. Inner splines 52 are formed on an inner circumference of the boss portion 51.

A root diameter 55 of the tooth portion 53 is formed into a conical shape from an inside diameter side which is bent in an axial direction to an outside diameter side which is bent in a radial direction. A tip diameter 57 of the tooth portion 53 is formed into a conical shape from the inside diameter side to the outside diameter side. A conical pitch line 59, which is formed into a conical shape, is positioned along an intermediate diameter between the conically shaped root diameter 55 and the conically shaped tip diameter 57.

The projecting back side portions 23a, 25a are formed at the tooth portion 53. The projecting back side portions 23a, 25a are formed to extend from the inside diameter side towards the outside diameter side beyond the conical pitch line 59 over a distance defined between a root diameter 56 which lies on an outside diameter side of the root diameter 55 of the tooth portion 53 and a tip diameter 58 which lies on an outside diameter side of the tip portion 57 of the tooth portion 53. On these projecting back side portions 23a, 25a, a portion 61 as an annular base portion is formed to extend in a position lying further radially inwards than the root diameter 56 on the outside diameter side of the root diameter 55 of the tooth portion 53. A radial extension width L1 of the portion 61 is set smaller than a radial width L2 of the tooth portion 53. Note that the portion 61 can also be omitted.

An annular depressed portion 63 is formed further radially inwards than the projecting back portions 23a, 25a so as to define a circumferential space between the depressed side gear supporting surface portions 13, 15 and the annular depressed portion 63.

Side washers 47, 49 are formed to have radial widths which correspond to overall widths of the projecting back side portions 23a, 25a, respectively. Radially inward edges 47a, 49a of the side washers 47, 49 are bent into the annular depressed portion 63 so as to be disposed in an engaging fashion in the annular depressed portion 63 with a minute space left between a vertical back surface 63a of the annular depressed portion 63 and themselves. Radially outermost edges of the side washers 47, 49 extend beyond the conical pitch line 59. Two cutaway portions 47b each having a shape corresponding to that of the cutaway depressed portion 41 which is formed in the case 3 are formed so as to face each other in the radial direction, whereby the incorporation of the pinion gears 17 into the case 3 is facilitated.

Consequently, an effective frictional radius R between the projecting back side portions 23a, 25a and the side washers 47, 49 is set between the root diameter 56 on the outside diameter side and the tip diameter 58 on the outside diameter side of the tooth portions 53 of the side gears 23, 25.

When the vehicle is turning at different speeds at the left and right wheels, the effective frictional radius R between the projecting back side portions 23a, 25a and the side washers 47, 49 lies between the root diameter 56 on the outside diameter side and the tip diameter 58 on the outside diameter side of the side gears 23, 25. This enables the performance of a good-response differential action limiting operation which is linked with the drive system. Thus, the differential apparatus can be realized which has an appropriate differential action limiting function which can increase the starting and hill-climbing properties of a general vehicle. According to the differential apparatus of Embodiment 1, a property of torque bias ratio (referred to as TBR) being in the order of 1.4 to 1.8 can be provided easily and stably without involving any individual variation, thereby making it possible to ensure the durability which is equal to or better than that of the conventional-differentials.

Further, to describe the shapes of the side gears 23, 25, rotational direction end portions 54a, 54b (tooth end surface end portions) of the tip diameter 57 in the back side of the tooth portion 53 are round-chamfered or angle-chamfered at an angle ranging from 15° to 45°, whereby lubricating oil staying between individual tooth portions 53 can easily be introduced towards sliding portions between the side washers 47, 49 in the rotational direction when the side gears 23, 25 slide in the corresponding depressed side gear supporting surface portions 13, 15. In addition, the sticking of sliding portions of the side gears 23, 25 to sliding portions of the side washers 47, 49 can also be prevented, whereby the sliding response is improved and the stabilization of frictional properties can be realized. Further, a shape of each of the chamfering portion at the rotational direction end portions 54a, 54b (tooth end surface end portions) of the tip diameter 57 of the tooth portion 53 is formed such that a chamfering amount becomes larger as it goes to the outer diameter side. By this shape of the each of the chamfering portions, a feeding of the lubricating oil toward the sliding portions is facilitated at the outer diameter side where a sliding speed in the rotational direction is high.

A flat surface portion 60 is formed at the tip diameter 58 on the outside diameter side of the tooth portions 53 of the side gears 23, 25. This flat surface portion 60 prevents the interference between a distal end at the outside diameter side of the tooth portion 53 with the side washers 47, 49 even when a minute deviation of axes of the side gears 23, 25 is caused as a result of the side gears 23, 25 meshing with the pinion gears 17, 17 or coupling with side shafts on rear axles which are not shown, thereby making it possible to stabilize the frictional properties.

[Incorporation of Differential Gears]

Figure 6:
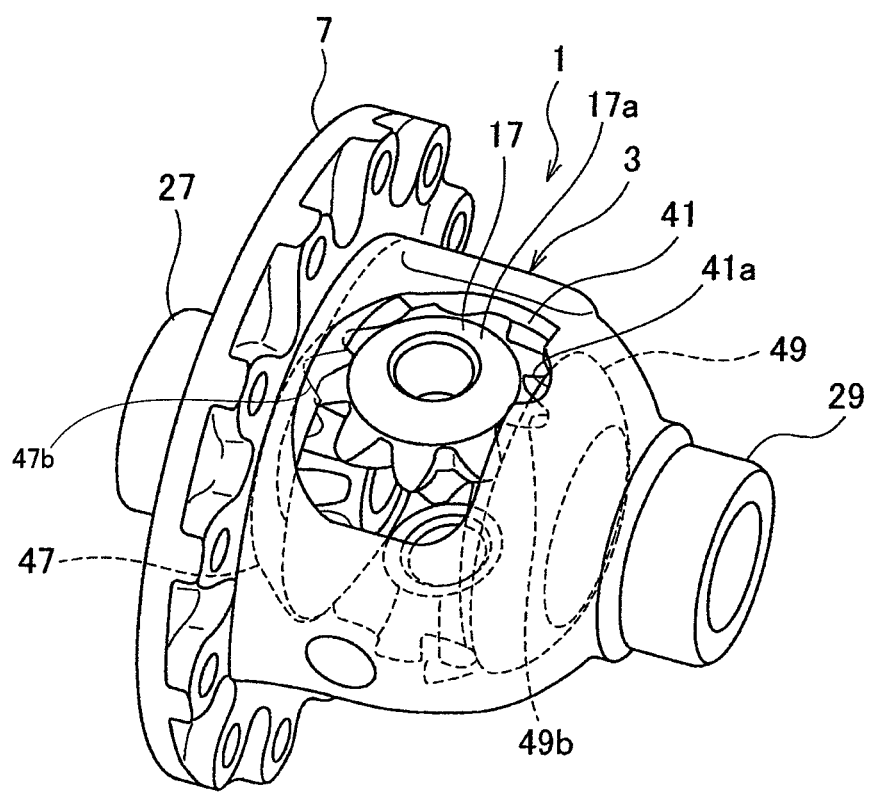
FIG. 6 is a perspective view of the case showing a state in which differential gears are being incorporated in the differential apparatus.
Figure 7:
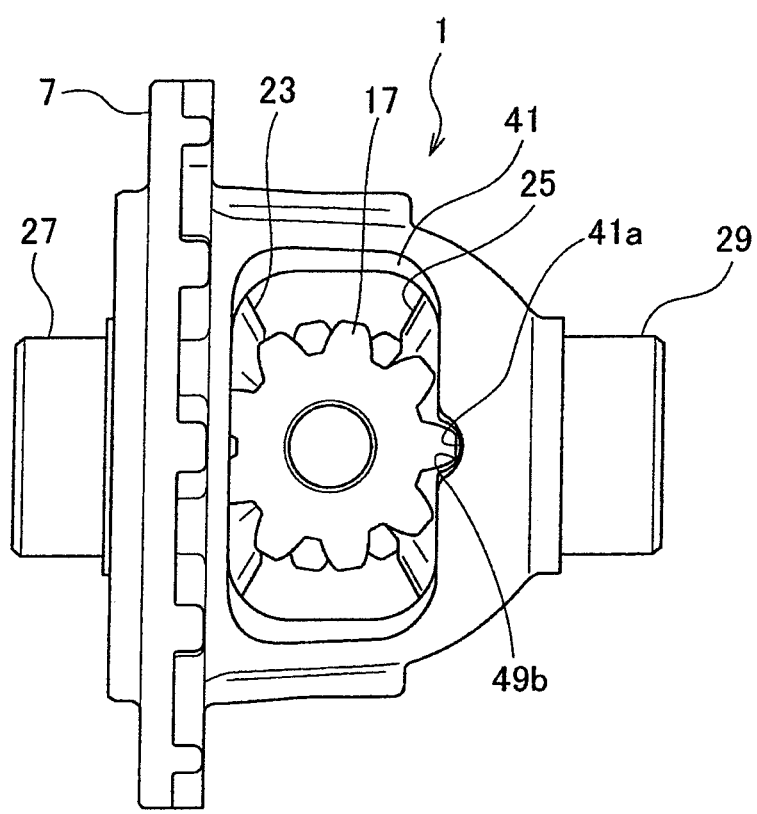
FIG. 7 is a plan view of the differential apparatus showing a state in which the differential gears are being incorporated in the differential apparatus.

FIG. 6 is a perspective view of the differential apparatus showing a state in which the differential gears are being incorporated into the case, and FIG. 7 is a plan view of the differential apparatus showing a state in which the differential gears are being incorporated into the case.

As FIGS. 1, 6 and 7 show, the side gears 23, 25 with the side washers 47, 49 disposed on the projecting back side portions 23a, 25a are inserted into the case 3 from either of the windows 41, so that the side gears 23, 25 are disposed in the corresponding depressed side gear supporting surface portions 13, 15 via the corresponding side washers 47, 49.

Following this, the pinion gears 17, 17 with the corresponding pinion washers 45 being in engagement with the projecting back side portions 17a are inserted individually from both the windows 41 so as to cause them to mesh with the side gears 23, 25. As this occurs, the cutaway depressed portions 41a, 47b, 49b prevent the interference of the pinion gears 17 with the tooth portions 53, facilitating the incorporation of the pinion gears 17 into the case 3.

The differential gears made up of the pinion gears 17 and the side gears 23, 25 are turned about the rotational axis of the case 3 through 90° with respect to the case 3, whereby the differential gears are disposed as shown in the upper half section of FIG. 1.

In such a state that the differential gears are disposed in place as shown in FIG. 1, the pinion shaft 35 is assembled, whereupon the incorporation of the differential gears is completed. Thereafter, the spring pin 50 is assembled between the case 3 and the pinion shaft 35, whereby the dislodgement and rotation of the pinion shaft 35 are prevented.

By providing an engagement portion which is brought into engagement with the side of the case 3 (preferably, an engagement portion which restricts the rotation of the pinion shaft 35 about an axis thereof) on at least one of the washers 47, 49, the engagement of the case 3 with the members which are incorporated in the interior of the case 3 can be maintained, thereby making it possible to increase the transportability of the case 3. Along with this, the sliding state between the side washers 47, 49 and the side gears 23, 25 can be stabilized.

In assembling the differential apparatus 1 which is built up in the way described above on to a motor vehicle, rear axles or side shafts are inserted into the inner circumferences of the boss portions 27, 29 of the case 3 so as to be spline coupled to the side gears 23, 25.

Effects of the Structures of Embodiment 1

The differential apparatus 1 of Embodiment 1 includes the case 3 which is supported rotatably, the pinion gears 17, 17 which are supported in the case 3 so as to rotate about their own axes, and the pair of side gears 23, 25 which are supported in the case 3 so as to rotate relatively and which mesh with the pinion gears 17. In addition, the spherically depressed pinion gear supporting surface portions 9, 11 and the spherically depressed side gear supporting surface portions 13, 15 are formed on the inner surface of the case 3. The spherically depressed pinion gear supporting surface portions 9, 11 and the spherically depressed side gear supporting surface portions 13, 15 support the spherically projecting back side portions 17a, 17a, 23a, 25a of the pinion gears 17, 17 and the side gears 23, 25 so as to rotate about their own axes. Additionally, the projecting back side portions 23a, 25a of the side gears 23, 25 which slide on the sides of the case 3 where the depressed side gear supporting surface portions 13, 15 are situated are formed on the tooth portions 53 of the side gears 23, 25.

Because of this, the effective frictional radius R of the projecting back side portions 23a, 25a can be set larger than that of the conventional-differential, whereby the LSD which is linked with the drive system to provide a good response can be obtained with the simple construction, thereby making it possible to satisfy the propagation of differential apparatuses which are simple in construction and low in cost.

The effective frictional radius R of the projecting back side portions 23a, 25a is set between the root diameter 56 on the outside diameter side and the tip diameter 58 on the outside diameter side of the tooth portions 53 of the side gears 23, 25.

Because of this, due to the configuration of the differential system, a larger differential action limiting function can be added with a size which is equal to the size of the conventional-differential, whereby the LSD which is linked with the drive system to provide a good response can be obtained with the simple construction.

The projecting back side portions 23a, 25a of the side gears 23, 25 which slide on the sides of the case 3 where the depressed side gear supporting surface portions 13, 15 are situated include the portion 61 which is provided to extend to the inside diameter side of the root diameter 56 on the outside diameter side of the tooth portions 53 of the side gears 23, 25.

Because of this, the effective frictional radius R can be kept large in an ensured fashion while reducing the surface contact pressure between the projecting back side portions 23a, 25a and the side washers 47, 49 (or between the depressed side gear supporting surface portions 13, 15, when sliding directly on the case 3). In addition, since the portion 61 is formed into the annular shape on the inside diameter side of the root diameter 56 on the outside diameter side of the tooth portion 53, the frictional properties can be stabilized by a stable sliding rotation of the side gears 23, 25.

The projecting back side portions 23a, 25a of the side gears 23, 25 are formed to extend beyond the conical pitch line 59 from the inside diameter side to the outside diameter side over the distance defined from the root diameter 56 on the outside diameter side to the tip diameter 58 on the outside diameter side of the tooth portions 53.

Because of this, the effective frictional radius R of the projecting back side portions 23a, 25a can be set to a largest limit with a size which is equal to that of the conventional-differential. In addition, by providing the sliding surface which corresponds to the conical pitch line 59 on the projecting back side portions 23a, 25a, a component of a force which is generated in the direction of the conical pitch line at the meshing portion between the pinion gears 17 and the side gears 23, 25 can be borne in an ensured fashion.

The annular depressed portion 63 is formed on the side gears 23, 25 which defines the circumferential space between the depressed side gear supporting surface portions 23a, 25a and the annular depressed portion 63 in the position lying further radially inwards than the projecting back side portions 23a, 25a.

Because of this, the lubricating oil can be made to stay in the annular depressed portion 63 in a circumferential fashion, whereby oil necessary at the sliding locations on the side where the projecting back side portions 23a, 25a are situated can be supplied thereto at all times. In addition, the thickness of portions which are not necessary to be thick is reduced, thereby making it possible to realize a reduction in weight of the differential apparatus 1.

The spherical side washers 47, 49 are interposed between the sides of the case 3 where the depressed side gear supporting surface portions 13, 15 are situated and the projecting back side portions 23a, 25 of the side gears 23, 25.

Because of this, an expensive hardening treatment does not have to be applied to the case 3, thereby making it possible to reduce the projection costs.

Modifications of Embodiment 1

Figure 8:
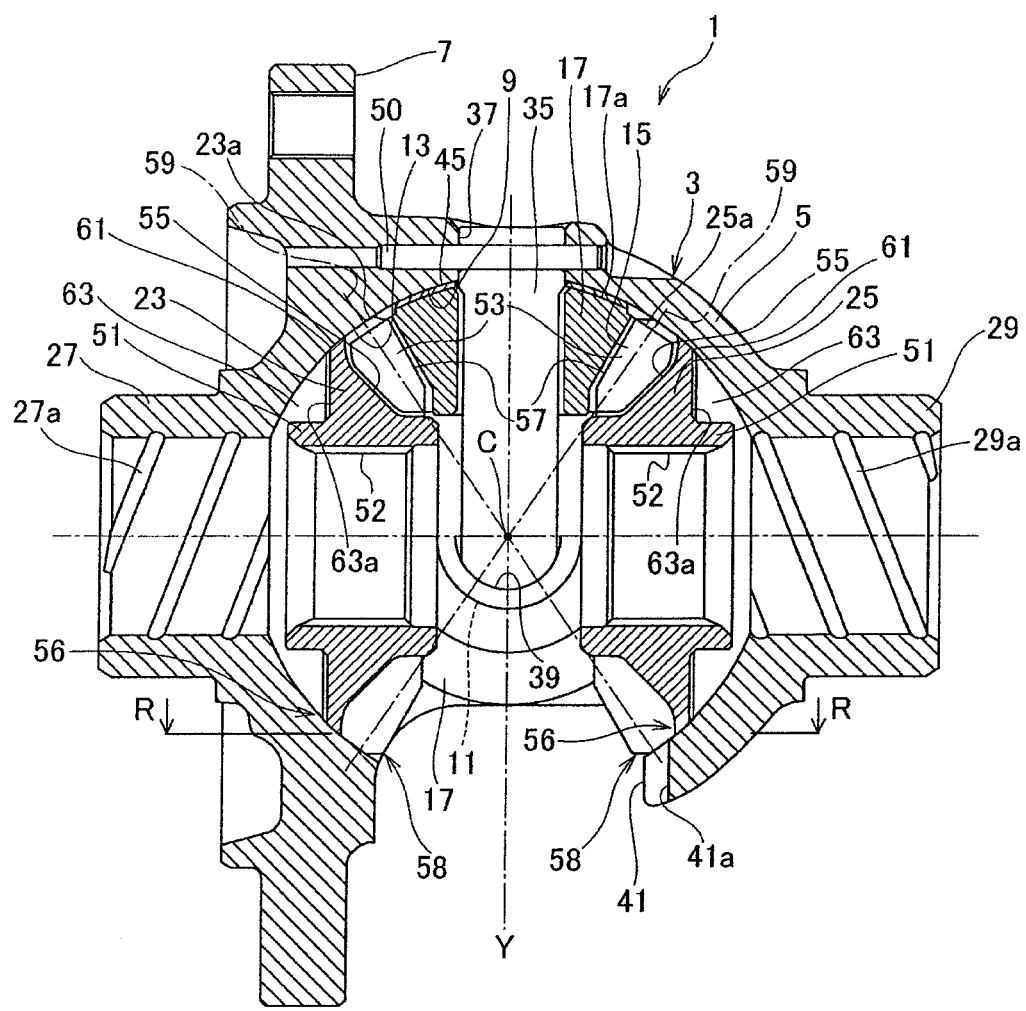
FIG. 8 is a sectional view of a differential apparatus with upper and lower sections located in positions which differ through 90 degrees.

The side washers 47, 49 which are provided in Embodiment 1 are not inevitable constituent members. According to one or more embodiments of the present invention, as shown in FIG. 8, the projecting back side portions 23a, 25a of the side gears 23, may be caused to slide directly on the depressed side gear supporting surface portions 13, 15. As this occurs, in consideration of wear occurring thereon when the depressed side gear supporting surface portions 13, 15 and the projecting back side portions 23a, 25a are brought into sliding frictional contact with each other, a high heating treatment or a hardening coating may be applied to the case 3.

Variously shaped oil grooves or oil holes may be formed or a surface roughening treatment may be applied to sliding surfaces which are formed on the projecting back side portions 23a, 25a of the side gears 23, 25 (specifically speaking, the tooth portions 53 or the portions 61), the side washers 47, 49 or the depressed side gear supporting surface portions 13, on the inner surface of the case 3 in order to stabilize the frictional properties.

Three or more pinion gears which mesh with the pair of side gears may be disposed in the case 3.

DESCRIPTION OF REFERENCE NUMERALS AND SIGNS 1 differential apparatus; 3 case; 9, 11 depressed pinion gear supporting surface portion; 13, 15 depressed side gear supporting surface portion; 17 pinion gear; 17a, 23a, 25a projecting back side portion; 23, 25 side gear; 47, 49 side washer; 56 root diameter on outside diameter side; 58 tip diameter on outside diameter side; 59 conical pitch line; 61 portion (annular base portion); 63 annular depressed portion; L1 extension width of projecting back side portion; L2 width of projecting back side portion at tooth portion; R effective frictional radius.

What is claimed is:
1. A differential apparatus comprising:
a case;
a pinion gear supported in the case so as to rotate about its own rotational axis;

a pair of side gears which are supported in the case and mesh with the pinion gear, wherein the side gears are rotatable relatively to each other;

a pinion washer;

a spherically depressed pinion gear supporting surface portion which is formed on an inner surface of the case and adapted to support a spherically projecting back side portion of the pinion gear via the pinion washer so that the pinion gear is slidingly rotatable about its own rotational axis; and spherically depressed side gear supporting surface portions which are formed on the inner surface of the case and adapted to respectively support spherically projecting back side portions of the side gears so that the side gears are slidingly rotatable about their own rotational axes, wherein the projecting back side portions of the side gears which are slidable on sides of the depressed side gear supporting surface portions are formed on tooth portions of the side gears.

2. The differential apparatus according to claim 1, wherein, in each of the side gears, an effective frictional radius of the projecting back side portion which is slidable on the side of the depressed side gear supporting surface portion is set between a root diameter on an outside diameter side and a tip diameter on the outside diameter side of the tooth portion of said each of the side gears.

3. The differential apparatus according to claim 1, wherein, in each of the side gears, the projecting back side portion includes an annular base portion which is provided to extend to an inside diameter side of a root diameter on an outside diameter side of the tooth portion.

4. The differential apparatus according to claim 1, wherein, in each of the side gears, the projecting back side portion is formed to extend radially outwards beyond a conical pitch line from a root diameter on an outside diameter side of the tooth portion.

5. The differential apparatus according to claim 1, wherein, in each of the side gears, an annular depressed portion is formed in a position further radially inwards than the projecting back side portion so that a circumferential space is defined between the depressed side gear supporting surface portion and the annular depressed portion.

6. The differential apparatus according to claim 1, wherein spherical side washers are respectively disposed between the depressed side gear supporting surface portions and the projecting back side portions of the side gears.

7. The differential apparatus according to claim 1, wherein the depressed side gear supporting surface portions constitute parts of a spherical surface having a center of curvature at an intersection point where the rotational axis of the pinion gear and rotational axes of the side gears intersect each other.

8. The differential apparatus according to claim 1, wherein, in each of the side gears, a chamfering that leads to the projecting back side portion is formed at each of rotational direction end portions of a tooth end surface of each of tooth portions.

9. The differential apparatus according to claim 1, wherein, in each of the side gears, an effective frictional radius of the projecting back side portion which is slidable on the side of the depressed side gear supporting surface portion is set between a root diameter on an outside diameter side and a tip diameter on the outside diameter side of the tooth portion of said each of the side gears, wherein, in each of the side gears, the projecting back side portion includes an annular base portion which is provided to extend to an inside diameter side of the root diameter on the outside diameter side of the tooth portion, wherein, in each of the side gears, the projecting back side portion is formed to extend radially outwards beyond a conical pitch line from the root diameter on the outside diameter side of the tooth portion, wherein, in each of the side gears, an annular depressed portion is formed in a position further radially inwards than the projecting back side portion so that a circumferential space is defined between the depressed side gear supporting surface portion and the annular depressed portion, wherein a spherical side washers are respectively disposed between the depressed side gear supporting surface portions and the projecting back side portions of the side gears, wherein the depressed side gear supporting surface portions constitute parts of a spherical surface having a center of curvature at an intersection point where the rotational axis of the pinion gear and rotational axes of the side gears intersect each other, and wherein, in each of the side gears, a chamfering that leads to the projecting back side portion is formed at each of rotational direction end portions of a tooth end surface of each of tooth portions.

* * * * *